(12) United States Patent
Kraley

(10) Patent No.: US 8,396,900 B1
(45) Date of Patent: *Mar. 12, 2013

(54) SYSTEM AND METHOD FOR EDITING AN ITEM LIST IN ELECTRONIC CONTENT

(75) Inventor: Michael Kraley, Lexington, MA (US)

(73) Assignee: Adobe Systems Incorporated, San Jose, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 13/081,267

(22) Filed: Apr. 6, 2011

Related U.S. Application Data

(63) Continuation of application No. 12/119,407, filed on May 12, 2008, now Pat. No. 7,945,595.

(51) Int. Cl.
G06F 7/00 (2006.01)
G06F 17/30 (2006.01)

(52) U.S. Cl. ........................................................ 707/802

(58) Field of Classification Search .................. None
See application file for complete search history.

(56) References Cited

U.S. PATENT DOCUMENTS

| | | | |
|---|---|---|---|
| 4,714,992 A | 12/1987 | Gladney et al. |
| 4,949,300 A | 8/1990 | Christenson et al. |
| 5,008,853 A | 4/1991 | Bly et al. |
| 5,014,267 A | 5/1991 | Tompkins et al. |
| 5,072,412 A | 12/1991 | Henderson, Jr. et al. |
| 5,220,657 A | 6/1993 | Bly et al. |
| 5,245,553 A | 9/1993 | Tanenbaum |
| 5,247,615 A | 9/1993 | Mori et al. |
| 5,293,619 A | 3/1994 | Dean |
| 5,339,389 A | 8/1994 | Bates et al. |
| 5,379,374 A | 1/1995 | Ishizaki et al. |
| 5,388,196 A | 2/1995 | Pajak et al. |
| 5,428,729 A | 6/1995 | Chang et al. |
| 5,446,842 A | 8/1995 | Schaeffer et al. |
| 5,471,318 A | 11/1995 | Ahuja et al. |
| 5,515,491 A | 5/1996 | Bates et al. |
| 5,608,872 A | 3/1997 | Schwartz et al. |
| 5,617,539 A | 4/1997 | Ludwig et al. |
| 5,664,183 A | 9/1997 | Cirulli et al. |
| 5,671,428 A | 9/1997 | Muranaga et al. |
| 5,732,184 A | 3/1998 | Chao et al. |
| 5,758,079 A | 5/1998 | Ludwig et al. |
| 5,764,902 A | 6/1998 | Rothrock |
| 5,778,368 A | 7/1998 | Hogan et al. |
| 5,787,175 A | 7/1998 | Carter |
| 5,835,601 A | 11/1998 | Shimbo et al. |
| 5,867,654 A | 2/1999 | Ludwig et al. |
| 5,907,324 A | 5/1999 | Larson et al. |
| 5,920,694 A | 7/1999 | Carleton et al. |
| 5,963,208 A | 10/1999 | Dolan et al. |
| 5,966,512 A | 10/1999 | Bates et al. |
| 5,978,817 A | 11/1999 | Giannandrea et al. |
| 5,995,097 A | 11/1999 | Tokumine et al. |

(Continued)

OTHER PUBLICATIONS

"U.S. Appl. No. 12/119,249, Final Office Action mailed Jun. 9, 2011", 15 pgs.

(Continued)

Primary Examiner — Uyen T. Le
(74) Attorney, Agent, or Firm — Schwegman Lundberg Woessner P.A.

(57) ABSTRACT

In various embodiments, a computerized method includes creating a first item of a list having at least two items that form a portion of electronic content. The computerized method can include creating a second item of the list within the electronic content, as well as converting the second item to a separate paragraph below the first item, wherein the separate paragraph is part of the first item. The computerized method may include creating another item of the list below the separate paragraph, wherein a continuity is maintained between the first item and the another item of the list. The computerized method includes storing the electronic content in a machine-readable medium.

20 Claims, 7 Drawing Sheets

U.S. PATENT DOCUMENTS

| | | | |
|---|---|---|---|
| 6,005,568 | A | 12/1999 | Simonoff et al. |
| 6,005,571 | A | 12/1999 | Pachauri |
| 6,088,702 | A | 7/2000 | Plantz et al. |
| 6,243,722 | B1 | 6/2001 | Day |
| 6,266,683 | B1 | 7/2001 | Yehuda et al. |
| 6,314,408 | B1 | 11/2001 | Salas et al. |
| 6,314,425 | B1 | 11/2001 | Serbinis et al. |
| 6,342,906 | B1 | 1/2002 | Kumar et al. |
| 6,366,933 | B1 | 4/2002 | Ball et al. |
| 6,442,748 | B1 | 8/2002 | Bowman-Amuah et al. |
| 6,446,093 | B2 | 9/2002 | Tabuchi |
| 6,502,113 | B1 | 12/2002 | Crawford et al. |
| 6,507,845 | B1 | 1/2003 | Cohen et al. |
| 6,584,466 | B1 | 6/2003 | Serbinis et al. |
| 6,632,251 | B1 | 10/2003 | Rutten et al. |
| 6,643,663 | B1 | 11/2003 | Dabney et al. |
| 6,701,345 | B1 | 3/2004 | Carley et al. |
| 6,721,921 | B1 | 4/2004 | Altman |
| 6,757,871 | B1 | 6/2004 | Sato et al. |
| 6,772,393 | B1 | 8/2004 | Estrada et al. |
| 6,816,906 | B1 | 11/2004 | Icken et al. |
| 6,819,806 | B1 | 11/2004 | Kubota et al. |
| 6,839,878 | B1 | 1/2005 | Icken et al. |
| 6,865,548 | B2 | 3/2005 | Wiechers |
| 6,865,713 | B1 | 3/2005 | Bates et al. |
| 6,874,124 | B2 | 3/2005 | Murase et al. |
| 6,889,896 | B2 | 5/2005 | Silverbrook et al. |
| 6,894,804 | B2 | 5/2005 | Nguyen et al. |
| 6,898,601 | B2 | 5/2005 | Amado et al. |
| 6,901,376 | B1 | 5/2005 | Sculler et al. |
| 6,918,082 | B1 | 7/2005 | Gross et al. |
| 6,934,721 | B2 | 8/2005 | Schein |
| 6,950,828 | B2 | 9/2005 | Shaw et al. |
| 6,991,154 | B2 | 1/2006 | Silverbrook et al. |
| 7,007,232 | B1 | 2/2006 | Ross et al. |
| 7,028,267 | B1 | 4/2006 | Beezer et al. |
| 7,044,363 | B2 | 5/2006 | Silverbrook et al. |
| 7,051,031 | B2 | 5/2006 | Schein |
| 7,062,532 | B1 | 6/2006 | Sweat et al. |
| 7,146,367 | B2 | 12/2006 | Shutt |
| 7,249,314 | B2 | 7/2007 | Walker et al. |
| 7,263,655 | B1 | 8/2007 | Carden, Jr. |
| 7,325,186 | B2 | 1/2008 | Jones et al. |
| 7,392,469 | B1 | 6/2008 | Bailin |
| 7,506,262 | B2 | 3/2009 | Gupta et al. |
| 7,574,669 | B1 | 8/2009 | Braun et al. |
| 7,587,407 | B2 | 9/2009 | Gruhl et al. |
| 7,676,759 | B2 | 3/2010 | Carter |
| 7,724,249 | B1 | 5/2010 | Horikawa et al. |
| 7,769,810 | B1 | 8/2010 | Kaufman |
| 7,904,425 | B2 | 3/2011 | Cannon et al. |
| 7,945,595 | B1 | 5/2011 | Kraley |
| 7,949,633 | B1 | 5/2011 | Shaver et al. |
| 7,950,064 | B2 | 5/2011 | Chavez et al. |
| 8,290,902 | B1 | 10/2012 | Shaver et al. |
| 2001/0043716 | A1 | 11/2001 | Price et al. |
| 2002/0133628 | A1 | 9/2002 | Asplund et al. |
| 2002/0163548 | A1 | 11/2002 | Chiu et al. |
| 2002/0186252 | A1 | 12/2002 | Himmel et al. |
| 2003/0214528 | A1 | 11/2003 | Pierce et al. |
| 2004/0041843 | A1 | 3/2004 | Cui et al. |
| 2004/0088331 | A1 | 5/2004 | Therrien et al. |
| 2004/0172595 | A1 | 9/2004 | Lerner et al. |
| 2005/0064858 | A1 | 3/2005 | Makela et al. |
| 2005/0081159 | A1 | 4/2005 | Gupta et al. |
| 2005/0193325 | A1 | 9/2005 | Epstein |
| 2005/0262225 | A1 | 11/2005 | Halpern et al. |
| 2006/0010382 | A1 | 1/2006 | Ejiri et al. |
| 2006/0026502 | A1 | 2/2006 | Dutta |
| 2006/0161578 | A1 | 7/2006 | Siegel et al. |
| 2006/0184901 | A1 | 8/2006 | Dietz |
| 2007/0118794 | A1 | 5/2007 | Hollander et al. |
| 2007/0198616 | A1 | 8/2007 | Goto |
| 2007/0239831 | A1 | 10/2007 | Basu |
| 2007/0260996 | A1 | 11/2007 | Jakobson |
| 2007/0271248 | A1 | 11/2007 | Albernoz et al. |
| 2007/0271502 | A1 | 11/2007 | Bedi et al. |
| 2008/0016091 | A1 | 1/2008 | Chandra |
| 2008/0059539 | A1 | 3/2008 | Chin et al. |
| 2008/0072135 | A1 | 3/2008 | Cragun et al. |
| 2008/0103877 | A1 | 5/2008 | Gerken |
| 2008/0209361 | A1 | 8/2008 | Nickerson et al. |
| 2008/0250329 | A1 | 10/2008 | Stefix et al. |
| 2008/0250332 | A1 | 10/2008 | Farrell et al. |
| 2009/0097815 | A1 | 4/2009 | Lahr et al. |
| 2009/0157811 | A1 | 6/2009 | Bailor et al. |
| 2009/0235155 | A1 | 9/2009 | Ueda |
| 2010/0145947 | A1 | 6/2010 | Kolman et al. |

OTHER PUBLICATIONS

"U.S. Appl. No. 12/119,397, Non-Final Office Action mailed Jun. 23, 2011", 20 pgs.

"U.S. Appl. No. 12/119,397, Response filed Aug. 10, 2011 to Non-Final Office Action mailed Jun. 23, 2011", 9 pgs.

"U.S. Appl. No. 12/119,421, Response filed May 12, 2011 to Advisory Action mailed Mar. 22, 2011", 15 pgs.

"U.S. Appl. No. 12/119,425, Final Office Action mailed Aug. 19, 2011", 18 pgs.

"U.S. Appl. No. 12/119,425, Response filed Jun. 1, 2011 to Non-Final Office Action mailed Mar. 1, 2011", 17 pgs.

"Adobe to Acquire Virtual Ubiquity", The Buzzword Blog, Building the first real word processor for the web, [Online] Retrieved from the internet: <URL:http://blog.buzzword.com/vu/index.php?paged=2>, (Oct. 1, 2007), 10 pgs.

"U.S. Appl. No. 12/119,249, Non-Final Office Action mailed Dec. 23, 2010", 11 pgs.

"U.S. Appl. No. 12/119,249, Response filed Mar. 23, 2011 to Non-Final Office Action mailed Dec. 23, 2010", 10 pgs.

"U.S. Appl. No. 12/119,335, Non-Final Office Action mailed Sep. 1, 2010", 8 pgs.

"U.S. Appl. No. 12/119,335, Notice of Allowance mailed Jan. 13, 2011", 4 pgs.

"U.S. Appl. No. 12/119,335, Response filed Dec. 1, 2010 to Non Final Office Action mailed Sep. 1, 2010", 12 pgs.

"U.S. Appl. No. 12/119,350, Advisory Action mailed Aug. 4, 2010", 3 pgs.

"U.S. Appl. No. 12/119,350, Final Office Action mailed May 12, 2010", 14 pgs.

"U.S. Appl. No. 12/119,350, Non-Final Office Action mailed Oct. 16, 2009", 11 pgs.

"U.S. Appl. No. 12/119,350, Pre-Appeal Brief Request filed Aug. 12, 2010", 5 pgs.

"U.S. Appl. No. 12/119,350, Response filed Jan. 19, 2010 to Non-Final Office Action mailed Oct. 16, 2009", 11 pgs.

"U.S. Appl. No. 12/119,350, Response filed Jul. 12, 2010 to Final Office Action mailed May 12, 2010", 10 pgs.

"U.S. Appl. No. 12/119,407, Non-Final Office Action mailed Sep. 9, 2010", 12 pgs.

"U.S. Appl. No. 12/119,407, Notice of Allowance mailed Feb. 18, 2011", 7 pgs.

"U.S. Appl. No. 12/119,407, Response filed Dec. 9, 2010 to Non-Final Office Action mailed Sep. 9, 2010", 17 pgs.

"U.S. Appl. No. 12/119,421, Advisory Action mailed Mar. 22, 2011", 3.

"U.S. Appl. No. 12/119,421, Final Office Action mailed Jan. 13, 2011", 27 pgs.

"U.S. Appl. No. 12/119,421, Non-Final Office Action mailed Sep. 14, 2010", 22 pgs.

"U.S. Appl. No. 12/119,421, Response filed Mar. 3, 2011 to Final Office Action mailed Jan. 13, 2011", 13 pgs.

"U.S. Appl. No. 12/119,421, Response filed Nov. 23, 2010 to Non-Final Office Action mailed Sep. 14, 2010", 14 pgs.

"U.S. Appl. No. 12/119,425, Non-Final Office Action mailed Mar. 1, 2011", 17 pgs.

"Comparison of office suites", Comparison of office suites—Wikipedia, the free encyclopedia, [Online] Retrieved from the internet: <URL:http://en.wikipedia.org/wiki/List_of_office_suites>, (Mar. 16, 2008), 4 pgs.

"Forthcoming Functionality", The Buzzword Blog, Building the first real word processor for the web, [Online] Retrieved from the internet: <URL:http://blog.buzzword.com/vu/index.php?paged=3>, (Jul. 15, 2007), 10 pgs.

"Google Docs", Google Docs—Wikipedia, the free encyclopedia, [Online]. Retrieved from the internet: <URL:http://en.wikipedia.org/wiki/Google_Docs>, (Mar. 16, 2008), 3 pages.

"List of word processors", From Wikipedia, the free encyclopedia The following is a list of word processors, [Online] Retrieved from the internet: <URL:http://en.wikipedia.org/wiki/List_of_word_processors>, (Mar. 16, 2008), 4 pgs.

"The Buzzword Blog Building the first real word processor for the web", Buzzword vs Google docs, [Online] Retrieved from the internet: <URL:http://blog.virtub.com/>, (Mar. 12, 2008), 13 pages.

"ThinkFree Docs :: Search, Share & Publish documents Page", [Online] Retrieved from the internet: <URL:http://www.thinkfreedocs.com/, (Mar. 16, 2008), 1 page.

"ThinkFree Docs::Search, Share & Publish documents", [Online]. Retrieved from the internet: <URL:http://www.thinkfreedocs.com/about/faq.html>, FAQ, (Mar. 16, 2008), 1 page.

"ThinkFree Office by Haansoft Corporation", From Wikipedia, the free encyclopedia (Redirected from ThinkFree), [Online] Retrieved from the internet: <URL:http://en.wikipedia.org/wiki/ThinkFree>, (Nov. 7, 2006), 3 pgs.

"Working with Collaborators: Real time collaboration", [Online]. Retrieved from the internet: <URL:http://documents.google.com/support/bin/answer.py?answer=40971&topic=8628>, Google Docs Help Center, (Mar. 16, 2008), 2 pages.

"Working with Collaborators: Simultaneous editing and viewing", [Online]. Retrieved from the internet: <URL:http://documents.google.com/support/bin/answer.py?answer=44680&topic=8628>, Google Docs Help Center, (Mar. 16, 2008), 2 pages.

"ZCubes", From Wikipedia, the free encyclopedia, [Online] Retrieved from the internet: <URL:http://en.wikipedia.org/wiki/ZCubes>, (Sep. 30, 2007), 5 pages.

"Zoho Office Suite", From Wikipedia, the free encyclopedia (Redirected from Zoho Writer) Developed by AdventNet Inc. <URL:http://www.zoho.com>, [Online] Retrieved from the internet: <URL:http://en.wikipedia.org/wiki/Zoho_Writer>, (Mar. 16, 2008), 5 pgs.

Descy, Don E, "Browser-Based Online Applications: Something for Everyone!", TechTrends: Linking Research and Practice to Improve Learning, 51(2), (Mar. 2007), 3-5.

Shen, H., "Integrating Advanced Collaborative Capabilities into Web-Based Word Processors", Lecture Notes in Computer Science, 4674, (2007), 1-8.

Simsarian, Kristian, et al., "Shared Spatial Desktop Development", Kungl Tekniska Hogskolan Royal Institute of Technology Numerical Analysis and Computing Science. CID-86, KTH, Stockholm, Sweden 1999, Report No. CID-86, ISSN No. ISSN 1403-073X Reports can be ordered from: URL: http://www.nada.kth.se/cid/, (Aug. 1999), 103 pages.

"U.S. Appl. No. 12/119,249, Examiner Interview Summary mailed Oct. 5, 2010", 3 pgs.

"U.S. Appl. No. 12/119,249, Response filed Oct. 10, 2011 to Final Office Action mailed Jun. 9, 2011", 9 pgs.

"U.S. Appl. No. 12/119,350, Appeal Brief filed Oct. 28, 2010", 25 pgs.

"U.S. Appl. No. 12/119,350, Decision on Pre-Appeal Brief Request mailed Sep. 28, 2010", 2 pgs.

"U.S. Appl. No. 12/119,350, Examiner's Answer to Appeal Brief mailed Nov. 29, 2010", 15 pgs.

"U.S. Appl. No. 12/119,397, Appeal Brief filed May 23, 2010", 17 pgs.

"U.S. Appl. No. 12/119,397, Final Office Action mailed Oct. 28, 2010", 18 pgs.

"U.S. Appl. No. 12/119,407, 312 Amendment filed Apr. 11, 2011", 3 pgs.

"U.S. Appl. No. 12/119,407, PTO Response to 312 Amendment mailed Apr. 15, 2011", 2 pgs.

"U.S. Appl. No. 12/119,421, Appeal Brief filed Jul. 27, 2012", 25 pgs.

"U.S. Appl. No. 12/119,421, Final Office Action mailed Feb. 29, 2012", 31 pgs.

"U.S. Appl. No. 12/119,421, Non Final Office Action mailed Oct. 18, 2011", 29 pgs.

"U.S. Appl. No. 12/119,421, Response filed Jan. 18, 2012 to Non Final Office Action mailed Oct. 18, 2011", 15 pgs.

"U.S. Appl. No. 12/119,421. Examiner Interview Summary mailed Jan. 31, 2012", 3 pgs.

"U.S. Appl. No. 12/119,425, Appeal Brief filed Mar. 22, 2012", 16 pgs.

"U.S. Appl. No. 12/119,425, Examiner's Answer mailed Jul. 6, 2012", 24 pgs.

"U.S. Appl. No. 13/081,236, Non Final Office Action mailed Jan. 24, 2012", 10 pgs.

"U.S. Appl. No. 13/081,236, Notice of Allowance mailed Jun. 14, 2012", 9 pgs.

"U.S. Appl. No. 13/081,236, Response filed Apr. 24, 2012 to Non Final Office Action mailed Jan. 24, 2012", 12 pgs.

Agarwal, Deborah, et al., "Supporting collaborative computing and interaction", Lawrence Berkeley National Laboratory, (May 22, 2002), 6 pgs.

SYSTEM AND METHOD FOR EDITING AN ITEM LIST IN ELECTRONIC CONTENT

CLAIM OF PRIORITY

This application is a continuation of U.S. application Ser. No. 12/119,407, filed May 12, 2008, now U.S. Pat. No. 7,945,595 which is incorporated in its entirety herein by reference.

COPYRIGHT

A portion of the disclosure of this document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software, data, and/or screenshots which may be described below and in the drawings that form a part of this document: Copyright 2008, Adobe® Systems Incorporated. All Rights Reserved.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section. As part of creating and editing electronic content (e.g., an electronic document), different types of lists are created, modified, and deleted.

BRIEF DESCRIPTION OF THE DRAWINGS

The embodiments are provided by way of example and not limitation in the figures of the accompanying drawings, in which like references indicate similar elements and in which.

DETAILED DESCRIPTION

Figure 1:
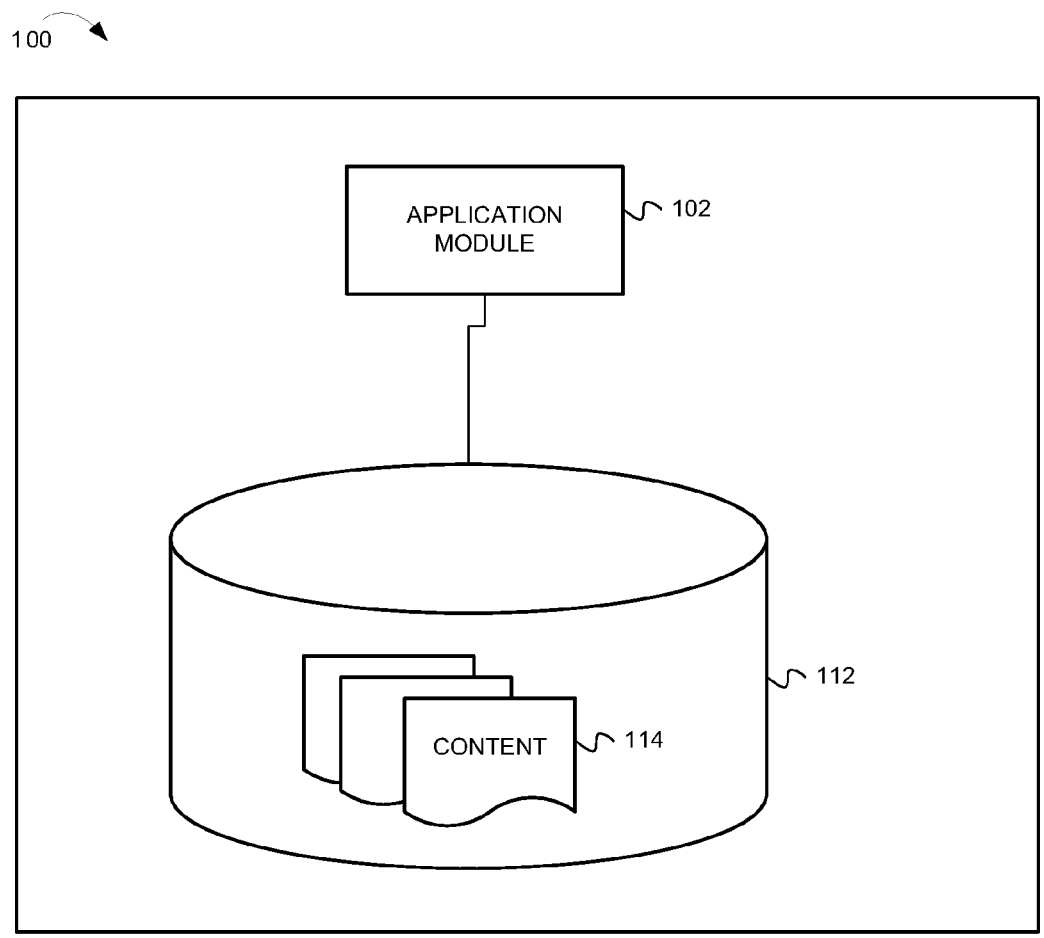
FIG. 1 is a system diagram for creating and editing items in a list, according to some example embodiments.

In some example embodiments, methods, apparatus and systems enable managing paragraphs associated with items in a list. The list, in turn, may form part of selected electronic content. The detailed application of the various methods, apparatus, and systems will be described after certain terms are defined.

As used herein, "content" or "electronic content" may comprise any type of content for use in electronic form. Examples of content may comprise Portable Document Format ("PDF") which may be viewed and modified in one of the Adobe® Acrobat® programs, a web page, a word processing document (such as a Microsoft® Word document), a spread sheet document, page-descriptive electronic content, hypertext document, a markup language document, declarative specification document (such as for example a hypertext markup language HTML or XML document), a fillable form or data describing application graphical user interface, etc.

As used herein, the term "continuity" relative to items in a list of electronic content may comprise any type consistency or continuation regarding any type of characteristic, parameter, etc. associated with items in a list. There may be continuity between items of different types of lists (ordered, unordered, etc.). For ordered lists, continuity between items may include an ordering (e.g., ascending, descending, etc.) relative to numbering, lettering, etc. For unordered lists, continuity between items may include consistency with respect to the use of bullets, dashes, etc. to demarcate a new item (as further described below). Continuity between items may also include the same type of format (e.g., a format style, which may be characterized by spacing, tabs, font, indentation, etc.).

Some example embodiments enable a creator or editor of a list forming a portion of electronic content to associate multiple paragraphs with the same item in a list. In conventional approaches, there is generally a one-to-one relationship between an item in a list and a paragraph. In contrast, in some example embodiments, there may be a one-to-N relationship between an item in a list and a paragraph, wherein N is greater than one. Accordingly, if a creator or editor of a list would like to include a large amount of data for an item in the list, the creator or editor may want to separate such data into multiple paragraphs.

Example embodiments may provide certain benefits, including the avoidance of cumbersome, error-prone workarounds that include the creation of two separate lists in response to positioning a separate paragraph below an item included in a first list. That is, in order to maintain order continuity (such as ascending numbering, lettering, etc.) between the items in the list, and a paragraph appended to the first list, a second list is typically started below the separate paragraph. The first item in this second list is ordered to begin where the last item in the first list ends. For example, if the last item (prior to adding a separate paragraph to the end of the first list) in the first list was number 15, the first item in the second list (after the separate paragraph is added) would start at number 16. Such approaches are cumbersome and subject to errors when items are added or deleted from one of the two resulting lists. For example, if an item is deleted from the first list, the user is usually required to update the numbering in the second list.

In some example embodiments, a Graphical User Interface (GUI) application may be presented for creating and editing of items in a list. In some example embodiments, the GUI application comprises a toggle button to convert an item in a list to a separate paragraph and vice versa.

For example, assume that a list comprises three items. If the cursor of the GUI application is positioned at the second item, the second item is converted into a separate paragraph that is then associated with the first item. In some example embodiments, the formatting between the first item and the separate paragraph is maintained. For example, the first item and the separate paragraph may have a same indentation, same font, etc. Thus, the first item may be used to set formatting for the second item, or the second item may be used to set formatting for the first item, depending on the user.

Moreover, continuity can be maintained between the first item and the third item. For example, if the list included ascending numbered items, after the second item was converted to a separate paragraph, the number for the third item would change from three to two. Accordingly, one list may be created wherein any or all of the items in the list may include any number of paragraphs. Some example embodiments are applicable to any type of list (e.g., ordered list, unordered list, etc.). Examples of ordered lists may include items that are in numeric order, alphabetical order, etc. Examples of unordered lists may include items that are delineated using bullets, dashes, etc.

FIG. 1 is a system diagram for creating and editing items in a list, according to some example embodiments. A system 100 comprises an application module 102 that is coupled to a machine-readable medium 112. The machine-readable medium 112 may store different types of electronic content 114.

The application module 102 may be software, hardware, firmware or a combination thereof for executing instructions to accomplish any of the operations described herein, including all of the methods disclosed herein, according to some example embodiments. The machine-readable medium may include tangible volatile and/or non-volatile media (e.g., read only memory (ROM), random access memory (RAM), magnetic disk storage media, optical storage media, flash memory devices, etc.). While shown as being in a same system, in some example embodiments, the application module 102 and the machine-readable medium 112 may be in separate systems. For example, the application module 102 and the machine-readable medium 112 may reside on a client device and a server device, respectively. Accordingly, the application module 102 may retrieve the content 114 over a network that couples together the client device and the server device.

As further described below, the application module 102 may present a GUI application that is used by a creator or editor of the content 114. For example, the GUI application may comprise an application for word processing, creating slide presentations, or editing spreadsheets, etc.

Operations, according to example embodiments, are now described. In certain embodiments, the operations are performed by executing instructions residing on machine-readable media (e.g., software), while in other embodiments, the methods are performed by hardware or other logic (e.g., digital logic). In some cases, the methods are performed using a combination of these approaches.

Figure 2:
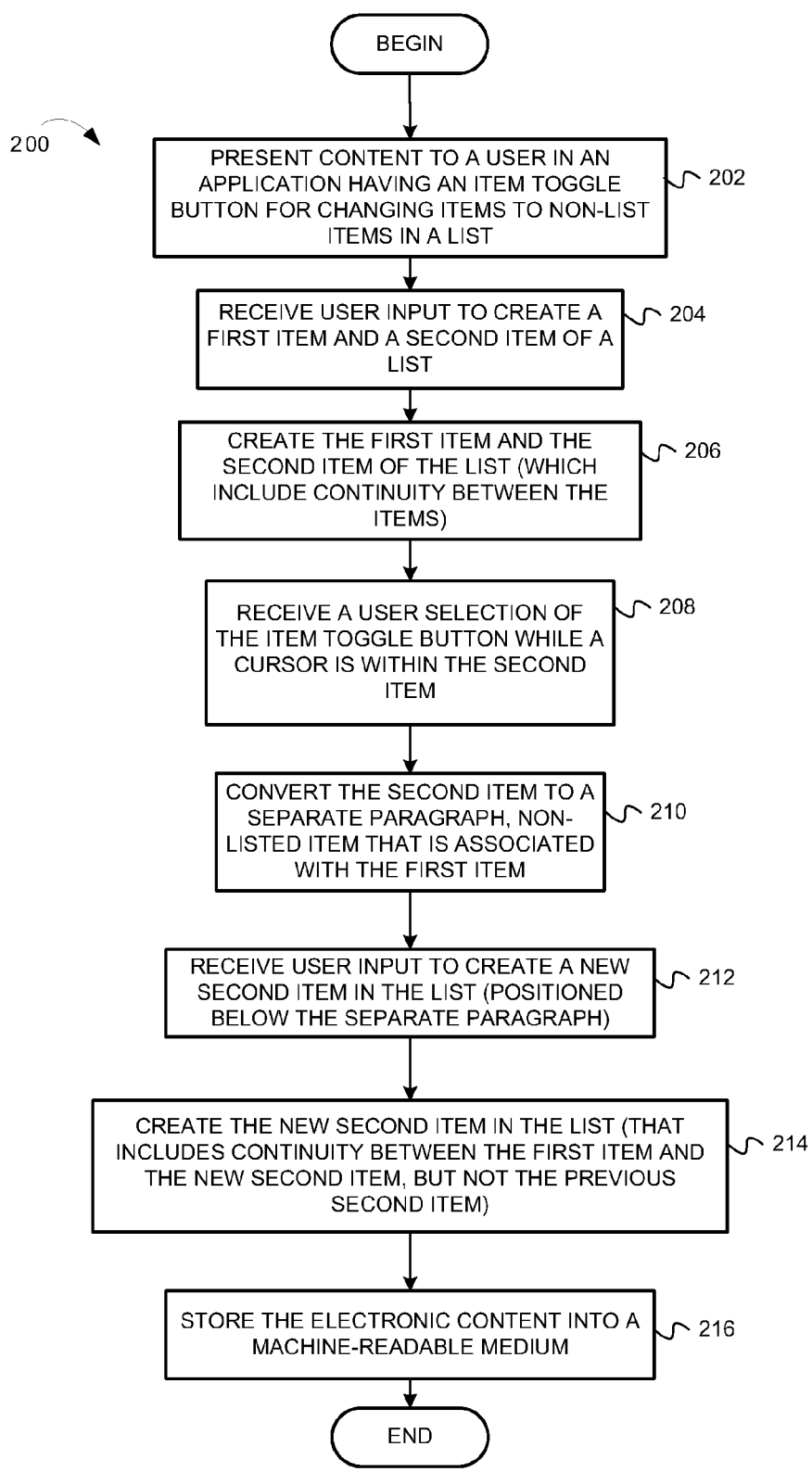
FIG. 2 is a diagram of a method for creating or editing items in a list, according to some example embodiments.

FIG. 2 is a diagram of a method for creating or editing items in a list, according to some example embodiments. A method 200 is described with reference to FIG. 1. In some example embodiments, the method 200 is performed by the application module 104. The method 200 illustrates example operations. However, example embodiments are not limited to the order, the type, or the number of operations disclosed therein. The method 200 commences at block 202.

At block 202, the application module 104 presents content 114 to a user by way of a GUI application. The GUI application may have an item toggle button for converting items to separate paragraphs associated with another item and vice versa.

Figure 3:
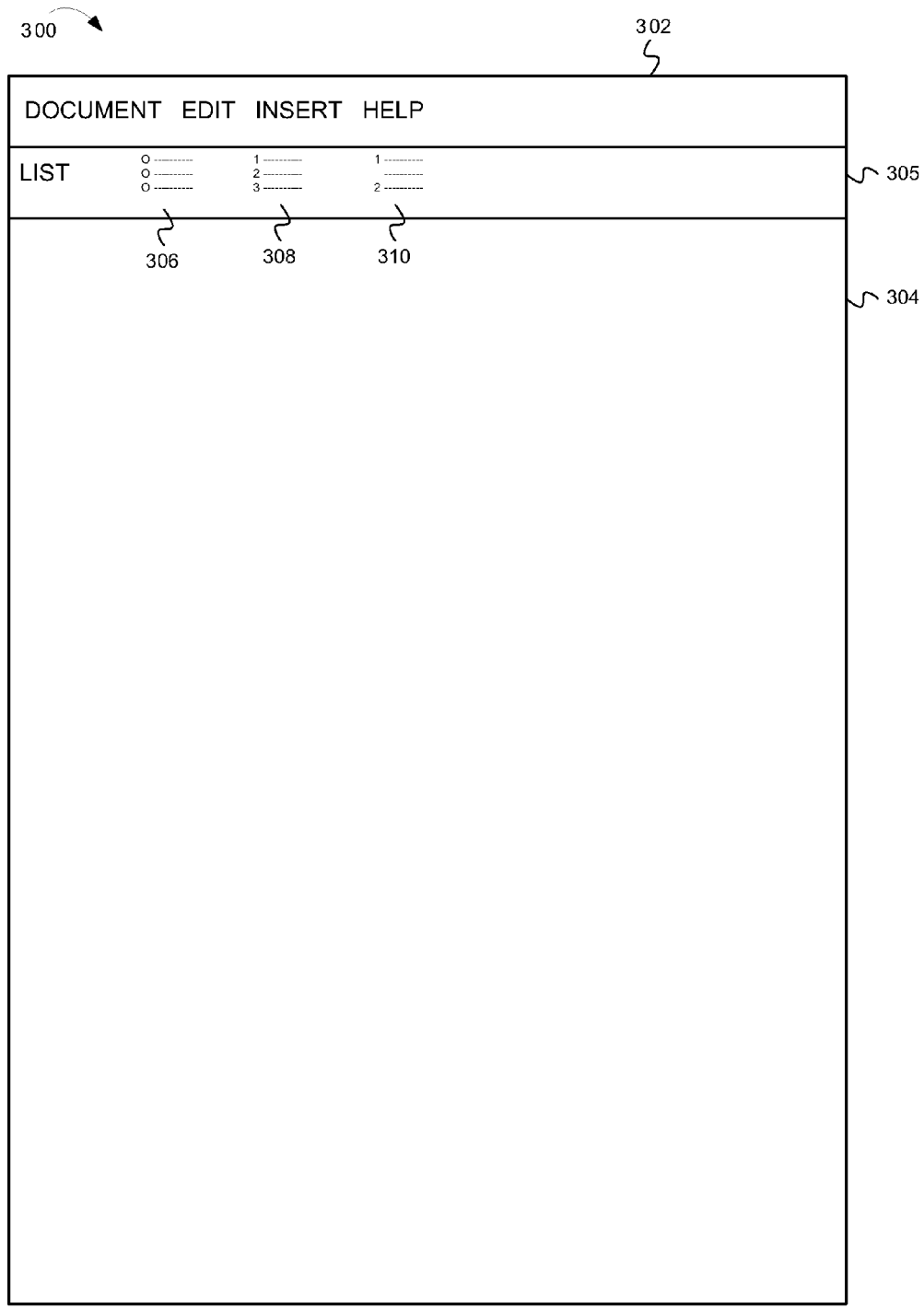
FIG. 3 shows a screenshot of an application that is used to create and edit items in a list, according to some example embodiments.

FIG. 3 shows a screenshot 300 of an application that is used to create and edit items in a list, according to some example embodiments. The screenshot 300 illustrates a word processing application 302 wherein an electronic document 304 is being edited. The word processing application 302 includes a list menu 305. The list menu 305 includes an unordered list button 306, an ordered list button 308 and an item toggle button 310. Any or all of the buttons 306, 308, 310 may be presented as an icon.

Upon selection, the unordered list button 306 causes the text on the line where the cursor is currently positioned to take the form of an item in an unordered list (e.g., using bullet, dashes, etc.). Upon selection, the ordered list button 308 causes the text on the line where the cursor is currently positioned to take the form of an item in an ordered list (e.g., numeric, alphabetic, etc.). Upon selection, the item toggle button 310 causes the text on the line where the cursor is currently positioned to take the form of a separate paragraph (assuming that the text where the cursor was positioned, prior to activating the item toggle button 310, was part of an item in a list). Alternatively, upon selection, the item toggle button 310 causes the text on the line where the cursor is currently positioned to take the form of an item in a list (assuming that the text where the cursor was positioned, prior to activating the toggle button 310, was part of a separate paragraph). Thus, the item toggle button 310 enables the user to easily convert portions of text between having the appearance of an item in a list, or having the appearance of a separate paragraph. In some example embodiments, if the text is converted from an item in a list to a separate paragraph and if there is an item in the list positioned above the converted text, the separate paragraph becomes a part of or associated with the item positioned above the converted text. In some example embodiments, as mentioned previously, the formatting (e.g., format style) between the first item and the separate paragraph is maintained. For example, the first item and the separate paragraph may have a same indentation, same font, etc. This particular example is described in more detail below. Returning now to FIG. 2, it can be seen that the method 200 continues at block 204.

At block 204, the application module 104 receives user input to create a first item and a second item in a list. The list may be ordered or unordered. A user may use a GUI application (as shown in FIG. 3) to input the first item and the second item of the list. To create the first item, the user may enter text into a first paragraph and select either the unordered list button 306 or the ordered list button 308. To create the second item in the same list, the user may enter a carriage return while the cursor is positioned within the first item). Alternatively, the user may create the second item in a manner similar to the creating of the first item. That is, by entering text and selecting the appropriate button 306, 308. The method 200 continues at block 206.

Figure 4:
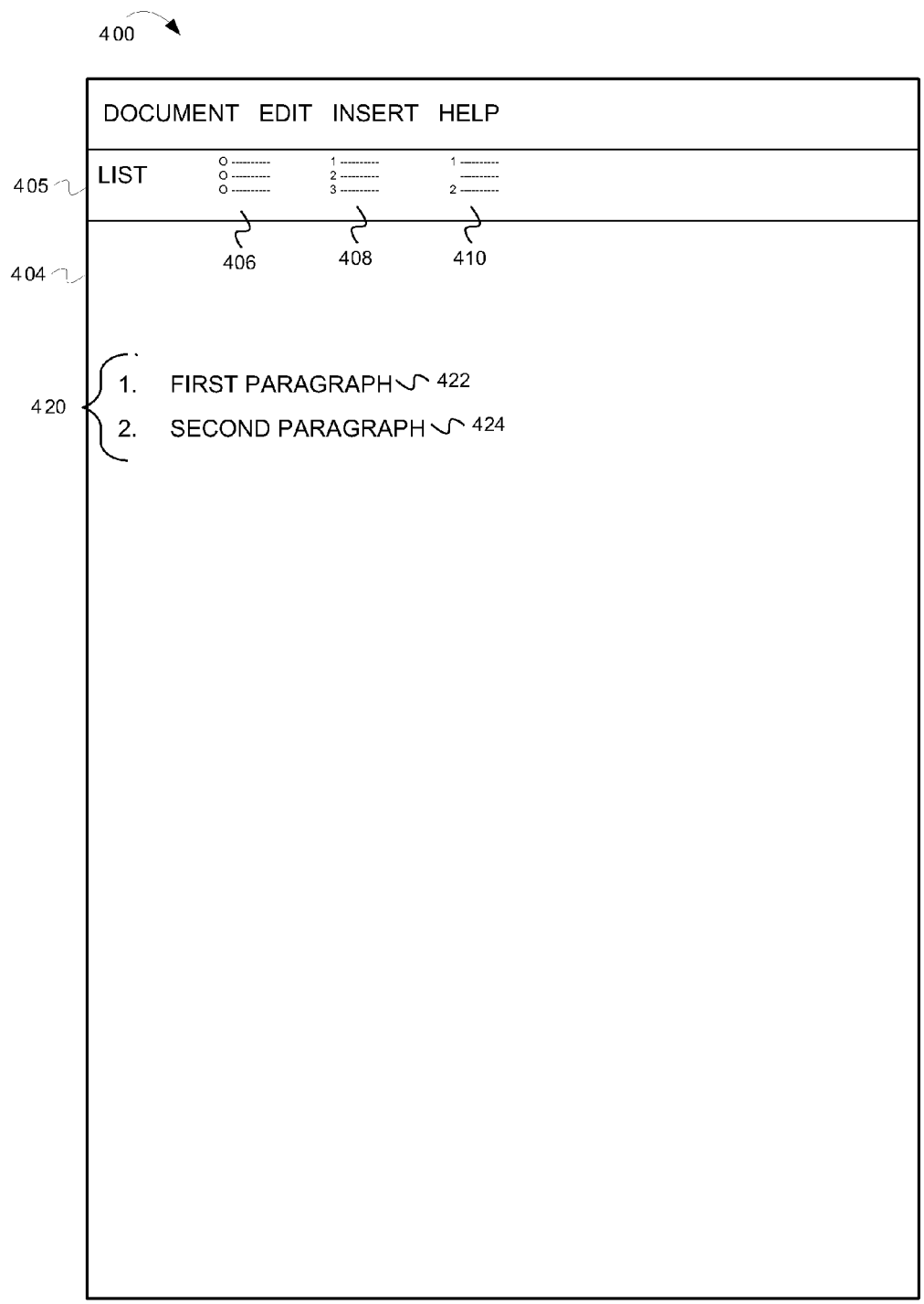
FIG. 4 shows a screenshot of a word processing application with an electronic document that includes a first item and a second item of a list, according to some example embodiments.

At block 206, the application module 104 creates the first item and the second item in the list (which in most embodiments includes continuity between the listed items). The application module 104 may update the electronic content that includes the first item and the second item, and update the display showing such content. To illustrate, FIG. 4 shows a screenshot 400 of a word processing application 402 with an electronic document 404 that includes a first item 422 and a second item 424 of a list 420, according to some example embodiments. In particular, a screenshot 400 is similar to the screenshot 300 of FIG. 3.

The screenshot 400 illustrates a word processing application 402 wherein an electronic document 404 is being edited. The word processing application 402 includes a list menu 405. The list menu 405 includes an unordered list button 406, an ordered list button 408 and an item toggle button 410 (as described above with respect to the description of FIG. 3). The screenshot 400 also illustrates a view of the electronic document 404 after the application module 104 has created a first item 422 and a second item 424 of a list 420. In this example, the list 420 comprises a numerically ascending ordered list (e.g., 1, 2, 3 . . . ).

The list 420 may comprise a number of types, including and ordered list, an unordered list, etc. Furthermore, the first item 422 and the second item 424 may have continuity. Continuity between the items 422, 424 may include order (e.g., ascending, descending, etc.) relative to the numbering, lettering, etc. Continuity may also include the format (e.g., format style, and/or spacing, tabs, font, indentation, etc.). For example, the first item 422 and the second item 424 include a numerical ascending order (1, 2, etc.), the same format (e.g., spacing between the numbers and the text, the same font, the same amount of indentation, etc.). Returning now to FIG. 2, it can be seen that the method 200 continues at block 208.

At block 208, the application module 104 receives a user selection of the item toggle button (e.g., as part of a GUI) while a cursor is positioned within the second item in the list. With reference to the example in FIG. 4, the cursor for the word processing application 402 could be positioned in the text for the second item 424, and then the user might select the item toggle button 410. The method 200 continues at block 210.

At block 210, the application module 104 converts the second item into a separate paragraph that is associated with the first item in the list. In some example embodiments, this conversion is in response to the user selection of the item toggle button. In some example embodiments, the formatting between the first item and the newly-added, but separate paragraph is maintained. For example, the first item and the separate paragraph may have the same indentation, same font, etc. The application module 104 may update the electronic content with the conversion of the second item and update the display to show this conversion.

Figure 5:
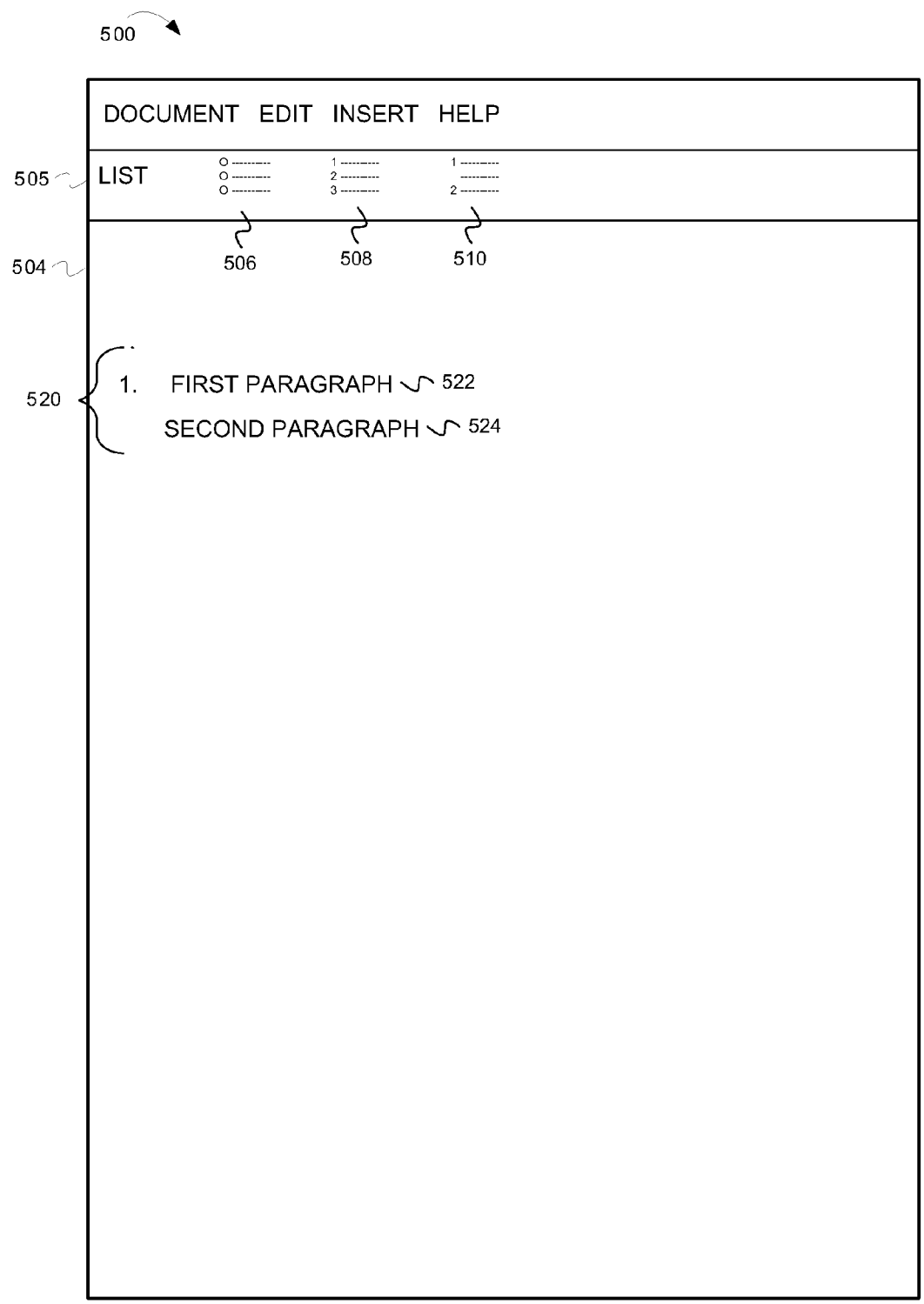
FIG. 5 shows a screenshot of a word processing application with an electronic document that includes the conversion of an item to a separate paragraph that is associated with another item, according to some example embodiments.

To illustrate, FIG. 5 shows a screenshot 500 of a word processing application 502 with an electronic document 504 that includes the conversion of an item to a separate paragraph that is associated with another item, according to some example embodiments. In particular, a screenshot 500 is similar to the screenshot 400 of FIG. 4. The screenshot 500 illustrates a word processing application 502 wherein an electronic document 504 is being edited. The word processing application 502 includes a list menu 505. The list menu 505 includes an unordered list button 506, an ordered list button 508 and an item toggle button 510 (as described above in the description of FIG. 3). The screenshot 500 also illustrates the view after the application module 104 has converted the second item 524 of the list 520 to a separate paragraph, as a non-listed item. Thus, the list 520 includes a first item 522 and a separate paragraph 524. In some example embodiments, the second paragraph item 524 is associated with the previous item (the first item 522). Accordingly, as described in contrast to conventional approaches, an item in a list may have one to N number of paragraphs. If a user decides to associate a large amount of text with an item, the user may delineate such text using multiple paragraphs. As further described below, the user is not required to create multiple separate lists in order to have multiple paragraphs for an item in a list. Thus, the separate paragraph is no longer formatted as an item in the list. Rather, in some example embodiments, this separate paragraph becomes part of the previous item in the list, so that the separate paragraph is now a member of the first item. Returning to FIG. 2, the method 200 continues at block 212.

At block 212, the application module 104 receives user input to create a new second item in the list. In this example, the new second item of the list is created below the first item (also below the separate paragraph that now exists as part of the first item). A user may use a GUI application (as shown in FIG. 3) to input the new second item of the list. To create the new second item, the user may enter text into a new paragraph below the separate paragraph of the first item. To create the new second item, the user may enter a carriage return while the cursor is positioned within the separate paragraph. Alternatively, the user may create the new second item in a manner similar to creating the first item. The method 200 continues at block 214.

Figure 6:
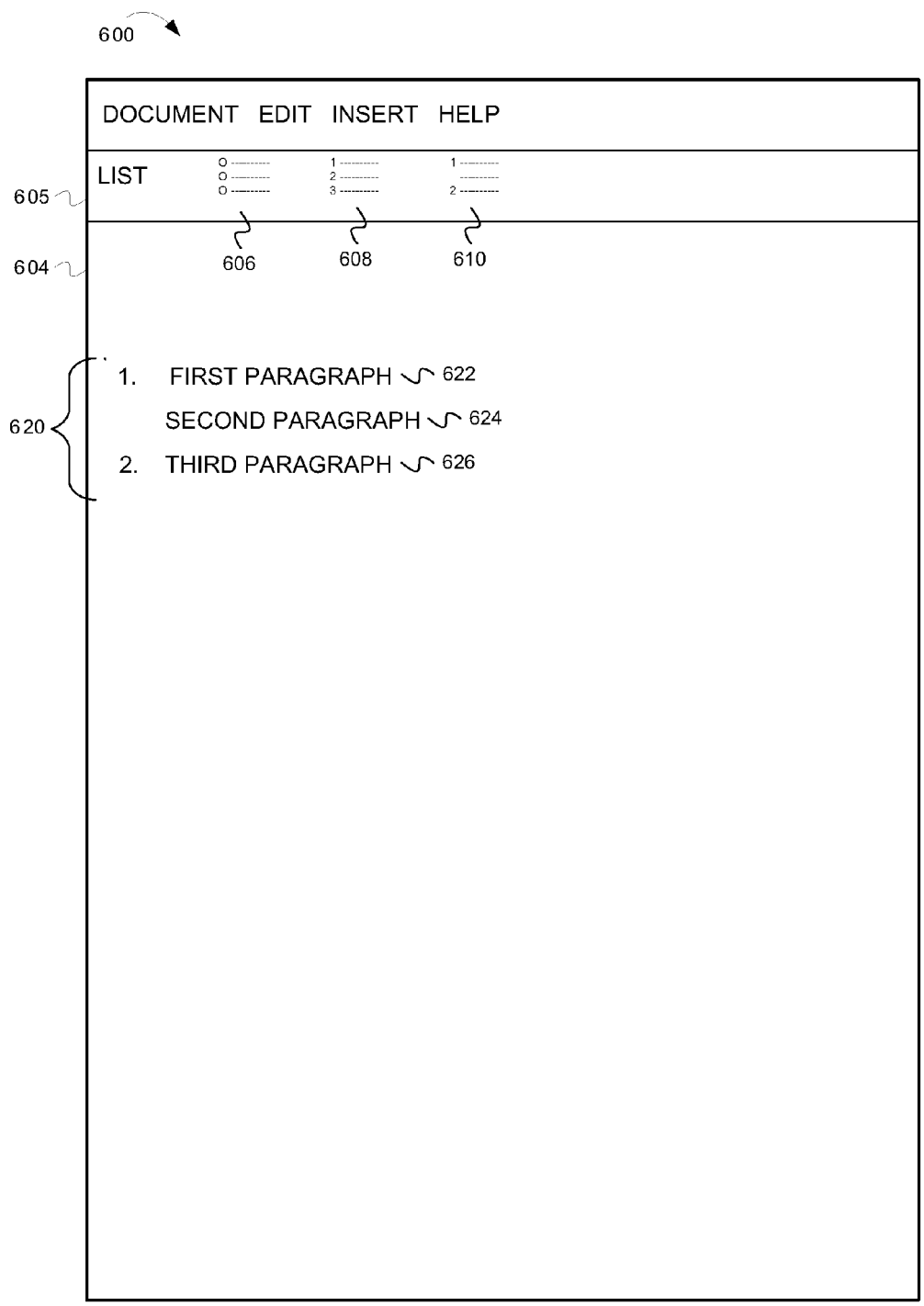
FIG. 6 shows a screenshot of a word processing application with an electronic document that includes a new item in the list below an item having multiple paragraphs, according to some example embodiments.

At block 214, the application module 104 creates the new second item in the list. The new second item remains a part of the same list as the first item. In some example embodiments, there is continuity between the first item and the new second item in the list. In some example embodiments, some or all of the continuity is not maintained relative to the previous second item (the separate paragraph that is part of the first item). To illustrate, FIG. 6 shows a screenshot 600 of a word processing application 602 with an electronic document 604 that includes a new item 626 in the list below an item 622 having multiple paragraphs, according to some example embodiments. In particular, a screenshot 600 is similar to the screenshot 500 of FIG. 5. The screenshot 600 illustrates a word processing application 602 wherein an electronic document 604 is being edited. The word processing application 602 includes a list menu 605. The list menu 605 includes an unordered list button 606, an ordered list button 608 and an item toggle button 610 (as described above in the description of FIG. 3).

The screenshot 600 also illustrates the view after the application module 104 has created a new second item 626 in a list 620. As shown, the new second item 626 is positioned below the last of multiple paragraphs of a first item 622 (that includes at least a second paragraph). In some example embodiments, there is continuity between the first item 622 and the new second item 626. In this example, continuity between the first item 622 and the new second item 626 includes numerical order (1, 2, . . . ). This continuity also includes the same format (e.g., spacing between the numbers and the text, the same font, the same indentation, etc.).

Thus, as described, the user may enter commands to create items in a list, to change an item in a list to a separate paragraph and vice versa. For example, the user may select the ordered list button 608 to format text as items in a list. The application module 104 may create a first item in the list based on text received from a user. This first item includes a first ordered item demarcation that is adjacent to the received text. For example, for an ordered list, the demarcation may include numbers or letters. After the user selects return to begin entering text on the next line, the application module 104 may receive a command to suppress presentation of an ordered item demarcation. For example, the user may select the item toggle button 610. Thus, the application module 104 creates a separate paragraph below the first item based on received text. As shown by the second paragraph in FIG. 6, no ordered item demarcation is presented adjacent to the received text of the separate paragraph (no numbering in this example). After the user selects return to begin entering text on the next line, the application module 104 may receive a command to resume presentation of an ordered demarcation (the numbering in the example of FIG. 6). The application module 104 may create a second item of the items in the list based on received text. Moreover, in response to the command to resume, a second ordered item demarcation is presented adjacent to the text for the second item (the numbering in the example of FIG. 6). As shown, the order continuity is maintained between the first ordered demarcation (number 1 for first paragraph in FIG. 6)

and the second ordered demarcation (number 2 for third paragraph in FIG. 6). Returning to FIG. 2, the method 200 continues at block 216.

At block 216, the application module 104 stores the electronic content in a machine-readable medium. The application module 104 may store updates to the electronic content (as described above) in the machine-readable medium 112 as well. This storage activity may be in response to a user-invoked save action, auto-save activity, etc. The operations of the flow diagram 200 are complete.

Some example embodiments are not limited to the order, the type or the number of operations as set forth for the method 200. As described for the method 200, there are operations for creating items in a list, converting an item to a separate paragraph, etc. In some example embodiments, additional items may be created in the list, additional conversions of items to separate paragraphs may occur, and items may be converted from a separate paragraph back to an item in a list, etc. Still more embodiments may be realized.

Figure 7:
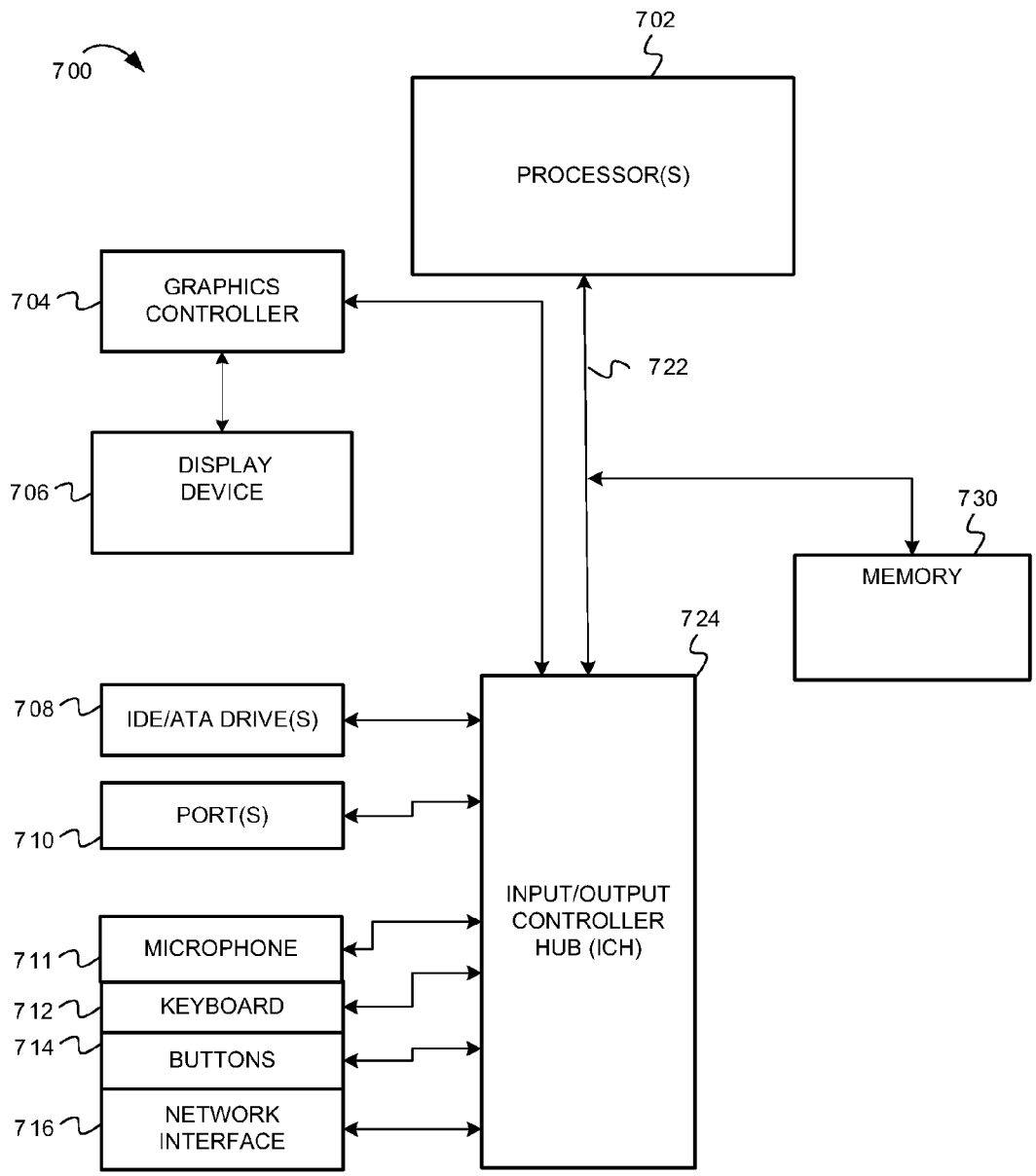
FIG. 7 illustrates a computer that may be used for creating and editing items in a list, according to some example embodiments.

For example, a detailed block diagram of an example computer environment, according to some embodiments, is now described. In particular, FIG. 7 illustrates a computer that may be used for creating and editing items in a list, according to some example embodiments. A computer system 700 may be representative of the system 100 of FIG. 1.

As illustrated in FIG. 7, the computer system 700 comprises processor(s) 702. The computer system 700 also includes a memory unit 730, processor bus 722, and Input/Output controller hub (ICH) 724. The processor(s) 702, memory unit 730, and ICH 724 are coupled to the processor bus 722. The processor(s) 702 may comprise any suitable processor architecture. The computer system 700 may comprise one, two, three, or more processors, any of which may execute a set of instructions in accordance with embodiments of the invention.

The memory unit 730 may store data and/or instructions, and may comprise any suitable memory, such as a dynamic random access memory (DRAM). The computer system 700 also includes IDE drive(s) 708 and/or other suitable storage devices. A graphics controller 704 controls the display of information on a display device 706, according to some embodiments of the invention.

The input/output controller hub (ICH) 724 provides an interface to I/O devices or peripheral components for the computer system 700. The ICH 724 may comprise any suitable interface controller to provide for any suitable communication link to the processor(s) 702, memory unit 730 and/or to any suitable device or component in communication with the ICH 724. For one embodiment of the invention, the ICH 724 provides suitable arbitration and buffering for each interface.

For some embodiments of the invention, the ICH 724 provides an interface to one or more suitable integrated drive electronics (IDE) drives 708, such as a hard disk drive (HDD) or compact disc read only memory (CD ROM) drive, or to suitable universal serial bus (USB) devices through one or more USB ports 710. For one embodiment, the ICH 724 also provides an interface to a keyboard 712, a mouse 714, a CD-ROM drive 718, one or more suitable devices through one or more Firewire ports 716. For one embodiment of the invention, the ICH 724 also provides a network interface 720 though which the computer system 700 can communicate with other computers and/or devices.

In some embodiments, the computer system 700 includes a machine-readable medium that stores a set of instructions (e.g., software) embodying any one, or all, of the methodologies for described herein. Furthermore, software may reside, completely or at least partially, within memory unit 730 and/or within the processor(s) 702.

Accordingly, if the apparatus, systems, and methods described herein are implemented, several benefits may accrue. These include facilitating the management of lists, whether ordered or unordered. Greater efficiency in document production may result.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism which provides (i.e., stores and/or transmits) information in a form accessible by a machine (e.g., a computer, a network device, a personal digital assistant, manufacturing tool, any device with a set of one or more processors, etc.). In example embodiments, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components which contain hard-wired logic for performing the operations, or by any combination of programmed data processing components and specific hardware components. Embodiments of the invention include software, data processing hardware, data processing system-implemented methods, and various processing operations, further described herein.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A method comprising:
   providing an electronic document having a first item and a second item of a list;
   receiving an indication to convert the second item to a separate paragraph of the first item; and
   converting, using one or more processors, the second item to the separate paragraph of the first item, the converting causing the separate paragraph to become a part of the first item.

2. The method of claim 1, further comprising creating a further item below the first item and the separate paragraph, continuity being maintained between the first item and the further item.

3. The method of claim 2, wherein at least one of the first item or the further item comprises N number of paragraphs, N being greater than one.

4. The method of claim 3, further comprising:
   receiving an indication to convert one of the N number of paragraphs to another item in the electronic document; and
   converting the one of the N number of paragraphs to the another item, continuity being maintained between the first item, the further item, and the another item.

5. The method of claim 1, wherein the converting of the second item to the separate paragraph causes the second item to be removed from consideration for continuity.

6. The method of claim 5, wherein the continuity comprises an ascending order continuity.

7. The method of claim 1, wherein the converting of the second item to the separate paragraph comprises receiving a user selection of a toggle button of a graphical user interface application that is used to edit the list within the electronic document.

8. A method comprising:
   providing an electronic document having a first item and a second item of a list, the first item having a first ordered item demarcation and comprising a plurality of paragraphs, the second item having a second ordered item demarcation, order continuity being maintained between the first ordered demarcation and the second ordered demarcation;
   receiving a command to convert one paragraph of the plurality of paragraphs in the first item to a further item; and
   converting, using one or more processors, the one paragraph to the further item, the converting causing a further order demarcation to be presented adjacent to text of the further item, the further order demarcation being between the first ordered demarcation and the second ordered demarcation in continuity.

9. The method of claim 8, wherein one or more of the plurality of paragraphs are created in response to receiving a command to suppress presentation of ordered item demarcation.

10. The method of claim 8, wherein the converting of the one paragraph comprises receiving a user selection of a toggle button of a graphical user interface application that is used to edit the list within the electronic document.

11. A non-transitory machine-readable medium including instructions, which when executed by a machine cause the machine to perform operations comprising:
   providing an electronic document having a first item and a second item of a list;
   receiving an indication to convert the second item to a separate paragraph of the first item; and
   converting the second item to the separate paragraph of the first item, the converting causing the separate paragraph to become a part of the first item.

12. The non-transitory machine-readable medium of claim 11, wherein the operations further comprise creating a further item below the first item and the separate paragraph, continuity being maintained between the first item and the further item.

13. The non-transitory machine-readable medium of claim 12, wherein at least one of the first item or the further item comprises N number of paragraphs, N being greater than one.

14. The non-transitory machine-readable medium of claim 13, wherein the operations further comprise:
   receiving an indication to convert one of the N number of paragraphs to another item in the electronic document; and
   converting the one of the N number of paragraphs to the another item, continuity being maintained between the first item, the further item, and the another item.

15. The non-transitory machine-readable medium of claim 11, wherein the converting of the second item to the separate paragraph causes the second item to be removed from consideration for continuity.

16. The non-transitory machine-readable medium or claim 15, wherein the continuity comprises an ascending order continuity.

17. The non-transitory machine-readable medium of claim 16, therein the ascending order continuity comprises an alphabetical ascending order.

18. A non-transitory machine-readable medium including instructions, which when executed by a machine cause the machine to perform operations comprising:
   providing an electronic document having a first item and a second item of a list, the first item having a first ordered item demarcation and comprising a plurality of paragraphs, the second item having a second ordered item demarcation, order continuity being maintained between the first ordered demarcation and the second ordered demarcation;
   receiving a command to convert one paragraph of the plurality of paragraphs in the first item to a further item; and
   converting the one paragraph to the further item, the converting causing a further order demarcation to be presented adjacent to text of the further item, the further order demarcation being between the first order demarcation and the second demarcation in continuity.

19. The non-transitory machine-readable medium of claim 18, wherein one or more of the plurality of paragraphs are created in response to receiving a command to suppress presentation of ordered item demarcation.

20. The non-transitory machine-readable medium of claim 18, wherein the converting of the one paragraph comprises receiving a user selection of a toggle button of a graphical user interface application that is used to edit the list within the electronic document.

* * * * *

UNITED STATES PATENT AND TRADEMARK OFFICE
CERTIFICATE OF CORRECTION

PATENT NO. : 8,396,900 B1
APPLICATION NO. : 13/081267
DATED : March 12, 2013
INVENTOR(S) : Kraley It is certified that error appears in the above-identified patent and that said Letters Patent is hereby corrected as shown below:

On the Title Page, Item [56]

On page 2, in column 2, under "Other Publications", line 12, after "[Online]", insert --.--, therefor On page 2, in column 2, under "Other Publications", line 44, after "3", insert --pgs--, therefor On page 2, in column 2, under "Other Publications", line 56, after "[Online]", insert --.--, therefor On page 2, in column 2, under "Other Publications", line 60, after "[Online]", insert --.--, therefor On page 3, in column 1, under "Other Publications", line 5, after "[Online]", insert --.--, therefor On page 3, in column 1, under "Other Publications", line 9, after "[Online]", insert --.--, therefor On page 3, in column 1, under "Other Publications", line 12, after "[Online]", insert --.--, therefor On page 3, in column 1, under "Other Publications", line 18, after "[Online]", insert --.--, therefor On page 3, in column 1, under "Other Publications", line 29, after "[Online]", insert --.--, therefor On page 3, in column 1, under "Other Publications", line 34, after "[Online]", insert --.--, therefor On page 3, in column 1, under "Other Publications", line 36, delete "E," and insert --E.,--, therefor On page 3, in column 1, under "Other Publications", line 44, delete "Science." and insert --Science,--, therefor On page 3, in column 2, under "Other Publications", line 22, delete "12/119,421 ," and insert --12/199,421,--, therefor Signed and Sealed this
Twenty-eighth Day of January, 2014

Michelle K. Lee
*Deputy Director of the United States Patent and Trademark Office*

CERTIFICATE OF CORRECTION (continued)
U.S. Pat. No. 8,396,900 B1

On page 3, in column 2, under "Other Publications", line 30, delete "12/119,421." and insert --12/199,421,--, therefor In the Claims:

In column 10, line 28, in claim 16, delete "or" and insert --of--, therefor

In column 10, line 32, in claim 17, delete "therein" and insert --wherein--, therefor